United States Patent
Rosenfield

(10) Patent No.: US 10,889,529 B2
(45) Date of Patent: Jan. 12, 2021

(54) ROCKET MOTOR PROPELLANTS, SYSTEMS AND/OR METHODS

(71) Applicant: Gary C. Rosenfield, Washington, UT (US)

(72) Inventor: Gary C. Rosenfield, Washington, UT (US)

(\*) Notice: Subject to any disclaimer, the term of this patent is extended or adjusted under 35 U.S.C. 154(b) by 1048 days.

(21) Appl. No.: 15/067,005

(22) Filed: Mar. 10, 2016

(65) Prior Publication Data

US 2016/0264489 A1 Sep. 15, 2016

Related U.S. Application Data

(60) Provisional application No. 62/131,143, filed on Mar. 10, 2015.

(51) Int. Cl.
*C06B 23/00* (2006.01)
*C06B 43/00* (2006.01)
*F02K 9/24* (2006.01)
*C06B 45/10* (2006.01)

(52) U.S. Cl.
CPC .............. *C06B 23/00* (2013.01); *C06B 43/00* (2013.01); *C06B 45/10* (2013.01); *F02K 9/24* (2013.01)

(58) Field of Classification Search
CPC .......... C06B 23/00; C06B 45/10; C06B 43/00
See application file for complete search history.

(56) References Cited

U.S. PATENT DOCUMENTS

| | | | | |
|---|---|---|---|---|
| 5,047,097 A | * | 9/1991 | Sayles | C06B 45/10 149/19.4 |
| 5,509,981 A | * | 4/1996 | Dean | C06B 21/0058 149/19.1 |
| 2010/0099798 A1 | * | 4/2010 | Costanzo | C06B 23/009 523/180 |
| 2011/0041475 A1 | * | 2/2011 | Hicken | F02K 9/346 60/253 |
| 2016/0046539 A1 | * | 2/2016 | Deppert | C06B 45/10 149/12 |

OTHER PUBLICATIONS

Mondur Product Datasheet, "MONDUR® MR", Covestro Edition, Dec. 15, 2011, 2 pages, Covestro LLC, Pittsburgh, Pennsylvania.
Karl V. Hoose, "Advanced Propulsion for Gun Launched Projectiles and Missiles: Phase I-Low Cost Flight Test Platform Development", Applied Thermal Sciences, Inc., Nov. 30, 2009, 101 pages, Office of Naval Research, Arlington, VA.
Defense Technical Information Center, "DDI 1410 R20LM", Retrieved from www.dtic.mil on May 11, 2016, 8725 John J. Kingman Road, Fort Belvoir, VA.
Industrial Coatings Technical Data Sheet, "DDI® 1410", BASF The Chemical Company, Oct. 2011, Rev 1, pp. 1-5, BASF Corporation, Wyandotte, Michigan.
Technical Data Sheet, Poly bd® R20LM, Cray Valley Hydrocarbon Specialty Chemicals, Jul. 2010, Cray Valley USA, Exton PA.
Material Safety Data Sheet, "Dibutyltin Dilaurate", Sigma-Aldrich, Jul. 12, 2013, V.4.6, pp. 1-7, Sigma-Aldrich Co., LLC, Saint Louis, MO.

\* cited by examiner

*Primary Examiner* — Aileen B Felton
(74) *Attorney, Agent, or Firm* — Peter B. Scull; HDC IP Law LLP

(57) ABSTRACT

A rocket motor propellant including a low molecular weight hydroxyl-terminated polybutadiene (HTPB) polymer and, a high molecular weight isocyanate. In some implementations, a rocket motor propellant hereof is plasticizer free.

13 Claims, 2 Drawing Sheets

TABLE 7:

ROCKET MOTOR PROPELLANTS, SYSTEMS AND/OR METHODS

PRIORITY

This application claims the benefit of provisional 61/131,143, the entire contents of which are incorporated herein by this reference thereto as if fully set forth here.

Propellants are described herein. Developments include in some implementations, inter alia, plasticizer-free propellants; and/or in some implementations propellants with high solids, room-temperature cure and/or AP-AL-HTPB any of which may be plasticizer-free propellants.

Hydroxyl-terminated polybutadiene (HTPB) propellants are widely used in modern solid propellant rocketry. These have very few disadvantages, but there is always room for improvement. The currently-described developments were generated by research initiated from the desire to develop a tougher more robust HTPB propellant that could be mixed, cast and cured at room temperature in a manner compatible with common manufacturing facilities.

Figure 1:
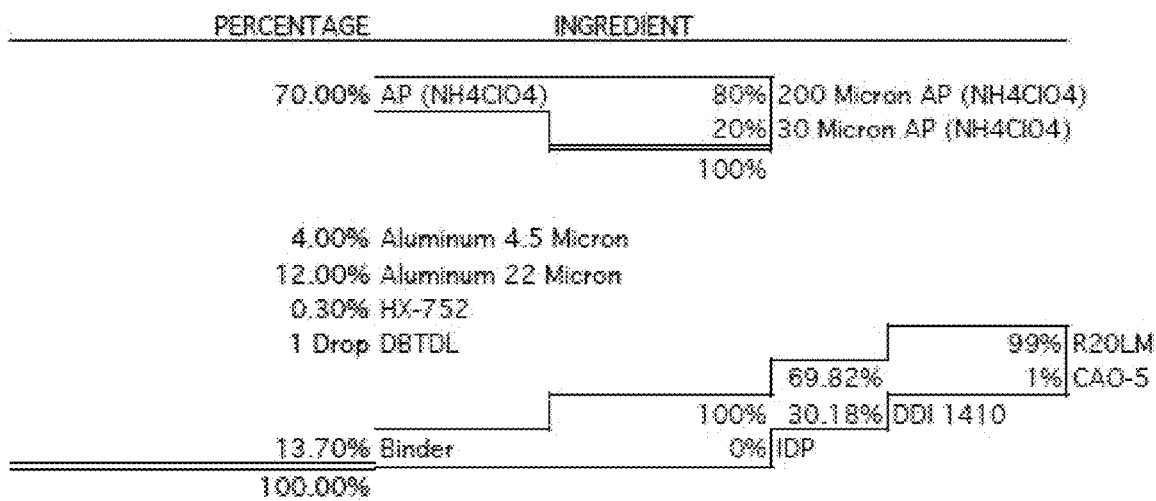
Figure 2:
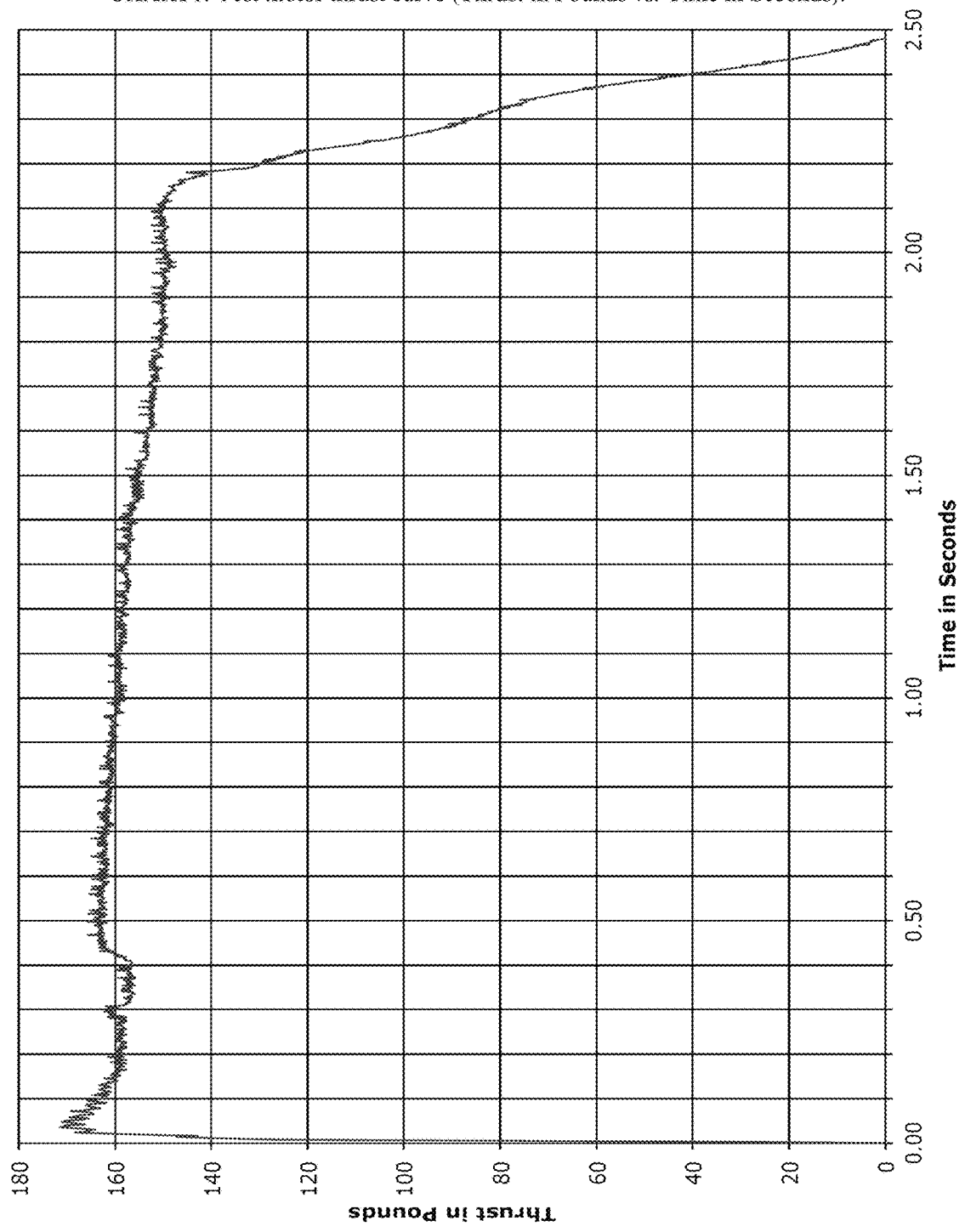

In the Drawings:
FIG. 1 is TABLE 7; and
FIG. 2 is CHART 1;

DETAILED DESCRIPTION

Acronyms and Symbols Used Herein

A tabular list of acronyms and symbols is set forth here (see Table 1):

TABLE 1

AP—Ammonium perchlorate
AL—Aluminum (typically, spherical powder)
cP—Centipoise (measure of viscosity)
DOA—Dioctyl adipate
EOM—End-of-mix
HDI—Hexamethylene diisocyanate
HTPB—Hydroxyl-terminated polybutadiene
IDP—Isodecyl pelargonate
IPDI—Isophorone diisocyanate
$I_s$—Specific impulse
$P_c$—Chamber pressure Other acronyms are chemical formulas or trade names may be used herein, as is understood in this field.

Typical HTPB propellant ingredients may include (see Table 2):

TABLE 2

Ammonium perchlorate (AP);
Spherical aluminum powder (AL);
R-45M or R-45HTLO polymer;
HDI or IPDI isocyanate;
DOA, IDP or similar plasticizer;
CAO-5 or similar antioxidant;
HX-752, HX-878 or other bonding agent;
Iron oxide ($Fe_2O_3$) or other rate catalyst;
High energy solid fraction (HMX, RDX, etc.)

Issues that are or often can be associated with conventional HTPB propellants may include one or more of: plasticizer migration; plasticizer outgassing (i.e., space motor application (space motor operation defined as in a vacuum)); physical properties limitations (stress and strain); heat cure usually needed; stresses induced into propellant grain upon cooling to ambient temperature; good castability typically requires hot mixing; and, isocyanate toxicity needs controls.

Some state of art concerns may include desirability for effective pourability and/or castability, particularly at temperature—often conventional mixes may need to heat like honey to achieve desirable properties. Also, pot-life can be a concern, manufacturers typically want a decent pot-life before hardening. Other concerns may include typical related side effects of curatives used for castability that can affect pot-life. Plasticizers can be used; but, then plasticizers can bring volatility, and/or can reduce strength. A further sometimes issue can be cost of materials with desirable characteristics.

In general, there are a number of variables concerning formulation of a desirable rocket motor propellant. Several of these include: end-of-mix (EOM) viscosity; solids loading (percentage); physical properties (stress and strain); energy ($I_s$); density; cost; residual in situ propellant stress; and toxicity (whether in one or more ingredients and/or in rocket motor exhaust). Following this, some objectively possibly ideal formulation parameters may include: high energy ($I_s$>265 sec@1,000/14.7 PSI); high density (0.063-0.065 lb./in3); processable at lower temperatures (approx. room temperature and/or 70 deg. F); excellent physical properties (stress and/or strain); no outgassing, esp. in space applications; no ingredient migration; low cost; formulation flexibility; compatibility with energetic components; transport as DOT (UN hazard classification scheme) 1.4C or 1.3C shipping classification.

As further background, several characteristics of typical binder ingredients appear. For R-45M and R-45HTLO polymers, several of these characteristics include: relatively high viscosity (@30° C.=4,400 cP); high equivalent weight (approximately 1,250 (dimensionless gram equivalent weight)) generally means low percentage of curative needed; usually requires some plasticizer for reducing EOM viscosity to degree needed for casting; usually requires elevated temperature mixing; can be cured at ambient or elevated temperatures depending on isocyanate and catalyst used; and low cost.

Other typical binder ingredients, as introduced above, may include HDI, IPDI and similar isocyanates which may exhibit low viscosity (3 cP for HDI, 15 cP for IPDI); effective legacy curatives for HTPB; low equivalent weight which means that only a small percentage may be used and does not significantly reduce propellant viscosity; toxic (relatively high vapor pressure); results in good physical properties; and, low cost. Other typical binder ingredients include DOA and IDP plasticizers which typically exhibit the following characteristics: effective at reducing EOM viscosity; relatively low vapor pressure; outgassing in a vacuum; can migrate into liners; can adversely affect physical properties (stress and/or strain); inhibit isocyanate cure (may be desirable); and low cost.

In the current developments, a rocket motor may be formed from the combination of a low molecular weight HTPB polymer with a high molecular weight isocyanate. In many implementations this will include those two parts. In some these include a new combination of two base ingredients including R20LM polymer (from Cray Valley and/or Total Petrochemical) and DDI 1410 isocyanate (from BASF). Resulting would be a combination of a low molecular weight HTPB polymer with a high molecular weight isocyanate to typically create a liquid submix of unusually low viscosity, suitable for combination with various oxidizers and metal fuels to produce a solid propellant formulation that can be mixed, cast and cured at room or elevated temperature without the need of inert plasticizing agents. In many typical implementations, the low molecular weight HTPB polymer is wherein the low molecular weight is less than about 1500. Also and/or alternatively, the high molecular weight isocyanate may in many typical applications have a high molecular weight is greater than about 500. In some implementations, a new combination of three base ingredients includes R20LM polymer (from Total Petrochemical); DDI 1410 isocyanate (from BASF) and Dibutyltin dilaurate ($C_{32}H_{64}O_4Sn$) as a cure catalyst to achieve a desirable plasticizer free rocket motor propellant. Results may include: mix and cure at room temperature or the like; no plasticizer being used; and any practical and/or desirable pot-life may be achieved. I.e., here, manufacturers may mix and cure at room temperature; often with no plasticizer; and any of a large variety of pot-lives sought.

In other words, in the least, the present disclosure involves a propellant, and/or a system including same and/or a process for formulating and/or using a propellant including a binder which is usually a polymer and a curative. In some preferred instances, the polymer is R20LM, a shorter molecule with a low molecular weight and having a low viscosity. As such, this binder could be used with other conventional curatives; however, here some preferred instances include the curative ddi 1410, a low viscosity material, i.e., a bigger molecule. Conventional propellant mixes have typically been in the 80-97 percent polymer relative to a curative of between about typically 7-13% curative; the conventional relationship being so that the curative does not thin out the mix too much. However, in the present developments, the range is more on the order of 70%-30% binder to curative here, give or take five or ten or perhaps even a bit more percent. Moreover, benefits may be found in as much as these may be considered off-the-shelf components, readily available and at competitive costs, typically. As a further alternative and/or addition, a urethane cure catalyst may be included. Such may be dibutyl tin dilaurate, a compound that may speed up the reaction of the other components. Some observable results include the possibility of hours of pot-life; cured in a couple days.

Other ingredients should be able to be used interchangeably (additionally and/or alternatively) including: ammonium perchlorate; co-oxidizers ($Sr(NO_3)_2$, etc.); aluminum powder; antioxidants (such as CAO-5); bonding agents (HX-752, HX-878); energetic solids (HMX, RDX); and/or burning rate catalysts ($Fe_2O_3$, etc.).

For each of the primary or base ingredients, several characteristics may appear. First, for R20LM polymers (may also be referred to as resin), these may include: shorter chain version of R-45M/HTLO; primary hydroxyl groups; equivalent weight=556; molecular weight=1,300; viscosity at 30° C.=1,500 cP; functionality=2.3; and low cost=$16.13/lb. in small quantities. Next, for DDI 1410 isocyanate; characteristics may include: it is based on 36 carbon atom aliphatic backbone; has low toxicity and low water sensitivity; equivalent weight=300; molecular weight=600; viscosity at 25° C.=150 cP; functionality=2.0; and low cost=$49.25/lb. in small quantities. Also, for the additional and/or perhaps optional ingredient dibutyltin dilaurate ($C_{32}H_{64}O_4Sn$), this may exhibit: being a liquid; being a catalyst for polyurethane reactions; having a molecular weight=631.6; being used at the 0.02-0.08% level; the percentage may be modified as necessary to obtain the required/desired pot life and cure times; it may be toxic, but is used in minute quantities; and low cost=$31.50/lb. in small quantities.

There may be alternative and/or additional formulation considerations including as non-limitative examples: use of bi-modal AP; use of bi-modal aluminum which may thus allow for adjustment of the AP and AL particle sizes to obtain a near-optimum tri-modal particle distribution; ingredient addition sequence may be of interest; use of HX-752 instead of HX-878 which may thus provide for little or no ammonia generation; and other ingredients may be used as for example, CAO-5.

Examples generated include a first example including the following. Characteristics of first test formulation (see Table 3):

TABLE 3

| |
|---|
| 86% solids |
| 16% aluminum |
| 0.0633 lb./in³ density |
| Liquids volume = 26.7% |
| 0.80 NCO:OH ratio |
| $I_s$ @ 1000/14.7 PSI = ~265.8 sec. |
| Equivalent to Shuttle RSRM propellant |
| Mix, cast and cure at room temperature |

For this example, ROM thermodynamic properties are shown here (see Table 4):

TABLE 4

| ROM thermodynamic properties: | | | |
|---|---|---|---|
| | CHAMBER | THR (SHIFT) | EXH (SHIFT) |
| PRESSURE (PSIA) | 1000.000 | 575.189 | 14.700 |
| EPSILON | .000 | 1.000 | 10.251 |
| ISP | .000 | 107.202 | 265.849 |
| ISP (VACUUM) | .000 | 200.804 | 290.371 |
| TEMPERATURE (K) | 3442.461 | 3239.405 | 2152.027 |
| MOLECULAR WEIGHT | 27.704 | 27.911 | 28.541 |
| MOLES GAS/100 G | 3.610 | 3.583 | 3.504 |
| CF | .000 | .659 | 1.634 |
| PEAE/M (SECONDS) | .000 | 93.602 | 24.521 |
| GAMMA | 1.177 | 1.176 | 1.198 |
| HEAT CAP (CAL) | 47.614 | 47.495 | 42.056 |
| ENTROPY (CAL) | 230.167 | 230.166 | 230.166 |
| ENTHALPY (KCAL) | −39.370 | −52.572 | −120.561 |
| DENSITY (G/CC) | 6.67356E−03 | 4.10968E−03 | 1.61668E−04 |

ENTHALPY = −39.37000
DENSITY = 1.754
CSTAR = 5235.62

More specifics for this first example test formulation composition include (see Table 5):

TABLE 5

| |
|---|
| 9.47% R20LM |
| 0.10% CAO-5 |
| 0.30% HX-752 |
| 4.00% Aluminum 4.5 micron |
| 12.00% Aluminum 22 micron |
| 4.13% DDI 1410 |
| 14.00% 30 micron AP |
| 56.00% 200 micron AP |
| 1 drop DBTDL (6,000 gram batch) |

In more detailed tabular form (see Table 6):

TABLE 6

| Ingredient | % By Weight | Weight, g | Tolerance, g |
|---|---|---|---|
| R20LM | 9.47% | 568.2 | 1.7 |
| CAO-S | 0.10% | 5.7 | 0.0 |
| HK-752 (or HX premix total = 592.0 | 0.30% | 18.0 | 0.1 |
| IDP | 0.00% | 0.0 | 0.0 |
| Aluminum 4.5 Micron | 4.00% | 240.0 | 0.7 |

TABLE 6-continued

| Ingredient | % By Weight | Weight, g | Tolerance, g |
|---|---|---|---|
| Aluminum 22 Micron | 12.00% | 720.0 | 2.2 |
| DDI 1410 | 4.13% | 248.0 | 0.7 |
| 30 Micron AP (NH4ClO4) | 14.00% | 840.0 | 2.5 |
| 200 Micron AP (NH4ClO4) | 56.00% | 3,360.0 | 10.1 |
| Totals | 100.00% | 6,000.0 | 18.0 |

Density = 0.06333 lb/in3
Liquids volume = 26.7%

Or, in another view (see Table 7 set forth as FIG. 1):

The mix procedure for this first example is as follows. In a 1 gallon shaker, add R20LM, CAO-5, HX-752, 4 micron AL, 22 micron AL, DDI 1410, DBTDL as a premix. Stir this premix by hand until thoroughly dispersed. Add 30 micron AP and mix four (4) minutes, scrape down. Next, add ½ addition of 200 micron AP and mix two (2) minutes; then, add second ½ addition of 200 micron AP, mix two (2) minutes, scrape down. Then, vacuum mix twelve (12) minutes, relieve vacuum and cast. Observations of mixed propellant include: good castability; Newtonian flow characteristics; acceptable pot life; 3-5 day cure time at room temperature; very tough; AP particles appear to be extremely well bonded in the propellant matrix; and, outstanding adhesion of cured propellant to paper tube inhibitor.

A test motor was then created. The design details included (see Table 8):

TABLE 8

Kraft paper tube BATES grain cartridge (inhibitor)
Grain tube O.D. = 1.870 inches, I.D. = 1.800 inches
Grain length: 3.991 inches × 3
Core diameter: 0.765 inches
Nozzle material: Glass-reinforced phenolic
Nozzle throat diameter: 0.455 inches
Nozzle exit diameter: 1.250 inches For the propellant formed, the following specifications (test motor data 12/10/14) were obtained (see Table 9):

TABLE 9

Diameter: 2.125"/54 mm
Length: 15.8"/401 mm
Propellant weight: 717 grams
Total impulse: 1,624N-sec
Burn time: 2.46 sec
Maximum thrust: 724N
Pc max: 657 PSI (calculated)
Average burn rate: 0.210"/sec
Is delivered: 231 sec For this test motor the following thrust curve was generated (see Chart 1, FIG. 2):

Results summary: high solids; high energy; no plasticizer used; processed at room temperature; excellent castability; cured at room temperature; apparent good physical properties (stress and strain); moderate cost at current scale.

One or more variations might be implemented as well. Examples include: different polymers and/or curatives; different oxidizer or co-oxidizer; different particle sizes; different metals; different bonding agent (or none); higher temperature mixing, casting and/or curing (and/or no cure catalyst); higher or lower solids loading; and/or larger or smaller batch sizes. Developments may include the following observations for alternatives within the scope hereof from typically pre-existing ingredients and/or mixes which may include: selecting lower equivalent weight polymers which may allow more low-viscosity isocyanate to be used; selecting higher equivalent weight isocyanate which may reduce the amount of higher-viscosity polymer; selecting lower-toxicity isocyanate; appreciating that if polymer-isocyanate mixture viscosity can be reduced sufficiently, plasticizer could be eliminated; selections according hereto increase ability to cure at ambient or elevated temperature; and, selections hereof may provide increased flexibility of formulation with other ingredients. Reduced "premix" viscosity is another beneficial observation, generally.

Applications for such may include: motors needing high strength propellant such as for high acceleration; and/or long duration space motors that can include no volatile ingredients; and/or applications where in situ propellant stress must be minimized; and/or applications where very low or zero plasticizer migration is desired; and/or when greater formulation flexibility is needed.

From the foregoing, it is readily apparent that new and useful embodiments of the present systems, apparatuses and/or methods have been herein described and illustrated which fulfill numerous desiderata in remarkably unexpected fashions. It is, of course, understood that such modifications, alterations and adaptations as may readily occur to the artisan confronted with this disclosure are intended within the spirit of this disclosure which is limited only by the scope of the claims appended hereto.

What is claimed is:

1. A rocket motor propellant comprising:
   a low molecular weight hydroxyl-terminated polybutadiene (HTPB) polymer

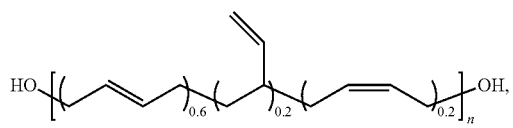

and,
   the low molecular weight of the low molecular weight HTPB polymer being less than about 1500; and,
   a high molecular weight diisocyanate,

D(NCO)$_2$, the molecular weight of the high molecular weight diisocyanate being greater than about 500;
   the low molecular weight HTPB polymer and the high molecular weight diisocyanate being selected for their respective structures to provide for generating a resultant compound combination having a sufficiently low viscosity providing the properties of being
   a liquid submix at room temperature, and,
   low viscosity, the low viscosity being defined as sufficiently low to achieve the compound combination being:
   mixed, cast and cured without the addition of heat.

2. A rocket motor propellant according to claim 1:
   the low molecular weight HTPB polymer being R20LM polymer; and,
   the high molecular weight diisocyanate being dimeryl diisocyanate 2-heptyl-3,4-bis(9-isocyanatononyl)-1-pentylcyclohexane.

3. A rocket motor propellant according to claim 1 further including one or more of:

a cure catalyst;
a urethane cure catalyst; and,
a urethane cure catalyst of dibutlytin dilaurate.

4. A rocket motor propellant according to claim 1 having on the order of about 70% to about 30% binder to curative.

5. A rocket motor propellant according to claim 1 further comprising in combination, one or both:
zero or more various oxidizers and
zero or more metal fuels.

6. A rocket motor propellant according to claim 1 without the need of inert plasticizing agents.

7. A rocket comprising:
a propellant housing having a fore end and an aft end; the propellant housing having:
a rocket motor propellant according to claim 1;
a nozzle operably connected to the aft end of the propellant housing; and,
a fore nose section operably connected to the fore end of the propellant housing.

8. A rocket motor propellant comprising:
a liquid submix at room temperature of:
a low molecular weight hydroxyl-terminated polybutadiene (HTPB) polymer, the low molecular weight of the low molecular weight HTPB polymer being less than about 1500; and,
a high molecular weight diisocyanate, the molecular weight of the high molecular weight diisocyanate being greater than about 500;
the low molecular weight HTPB polymer is

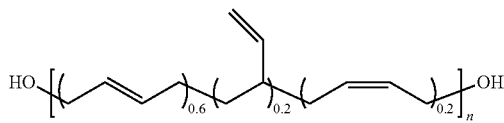

or chemical equivalent; and,
the high molecular weight diisocyanate is
$D(NCO)_2$ the low molecular weight HTPB polymer and the high molecular weight diisocyanate being selected for their respective structures to provide for generating a resultant compound combination producing a low viscosity solid propellant formulation that the low viscosity is disposed sufficiently low to achieve the compound combination being configured to result from being and having the properties of:
mixed,
cast and
cured
without addition of heat.

9. A rocket motor propellant according to claim 8 further including one or more of:
a cure catalyst;
a urethane cure catalyst; and,
a urethane cure catalyst of dibutyltin dilaurate.

10. A rocket motor propellant according to claim 8 having on the order of about 70% to about 30% binder to curative.

11. A rocket motor propellant according to claim 8 further comprising in combination, one or both:
zero or more various oxidizers and
zero or more metal fuels.

12. A rocket motor propellant according to claim 8 without the need of inert plasticizing agents.

13. A rocket comprising:
a propellant housing having a fore end and an aft end; the propellant housing having:
a rocket motor propellant according to claim 8;
a nozzle operably connected to the aft end of the propellant housing; and,
a fore nose section operably connected to the fore end of the propellant housing.

* * * * *